United States Patent [19]

Nishizawa et al.

[11] Patent Number: 4,504,865

[45] Date of Patent: Mar. 12, 1985

[54] IMAGE SIGNAL READOUT METHD FOR SOLID-STATE IMAGE SENSOR

[75] Inventors: Jun-ichi Nishizawa; Tadahiro Ohmi, both of Sendai; Makoto Murakoshi, Tokyo; Koji Shimanuki, Minami-ashigara, all of Japan

[73] Assignees: Semiconductor Research Foundation, Sendai; Fuji Photo Film Co., Ltd., Minami-ashigara, both of Japan

[21] Appl. No.: 418,677

[22] Filed: Sep. 16, 1982

[30] Foreign Application Priority Data

Sep. 18, 1981 [JP] Japan .................................. 56-147576

[51] Int. Cl.$^3$ ............................................. H01L 27/14
[52] U.S. Cl. .................................... 358/213; 358/212; 357/24; 357/30
[58] Field of Search .............................. 358/213, 212; 357/24 LR, 30

[56] References Cited

U.S. PATENT DOCUMENTS

| | | | |
|---|---|---|---|
| 4,377,817 | 3/1983 | Nishizawa et al. | 357/22 |
| 4,380,755 | 4/1983 | Endlicher et al. | 358/213 |
| 4,454,526 | 6/1984 | Nishizawa et al. | 357/30 |
| 4,467,361 | 8/1984 | Ohno et al. | 358/213 |

Primary Examiner—Gene Z. Rubinson
Assistant Examiner—Robert Lev
Attorney, Agent, or Firm—Staas & Halsey

[57] ABSTRACT

From each of a plurality of picture element cells having a non-destructive readout characteristic, arranged two-dimensionally and connected to the same signal output line, an image signal is read out without mutual interference of the picture elements. To this end, a blanking period is provided between the readout periods of the respective picture element cells connected to the same signal output line and, in this blanking period, the signal output line is cleared (refreshed).

8 Claims, 11 Drawing Figures

IMAGE SIGNAL READOUT METHD FOR SOLID-STATE IMAGE SENSOR

BACKGROUND OF THE INVENTION

The present invention relates generally to an image signal readout method for an image sensor and, more particularly, to an image signal readout method for an image sensor having a non-destructive readout characteristic.

Conventional CCD and MOS solid-state image sensors have what is called a destructive readout characteristic such that image information is extinguished by readout. In recent years, however, there has been developed a solid-state image sensor element having a hook structure which permits what is called non-destructive readout such that image information is not extinguished by readout. As described in detail, for instance, in Japanese Patent Applications Nos. 54001/80 and 60316/80, this image sensor element is equipped with a photodetecting function and a detected information storing function on account of such an arrangement that photocarriers are stored in a potential well of the hook structure. With the use of this image sensor element, it is not necessary to provide an image pickup section, a display section, such as a CRT, or a recording device for temporarily storing image information before recording image signals obtained on a magnetic tape or the like. Hence it is expected that this image sensor element will permit marked simplification of the construction of the image sensor and reduction of its cost as compared with the conventional image sensors.

In the studies for development of the image sensor capable of non-destructive readout, the present inventors encountered a new problem which had not been experienced with the conventional MOS and CCD types. That is, in the case where a number of such image sensor elements are connected to a common picture element signal output line and the picture elements to be read out are selected by scanning to sequentially read out their picture element information, the image information of each picture element is not destroyed even after the readout operation, so that the signal read out from the picture element remains on the common signal output line for a certain period of time, resulting in interference with the image signal read out from the next picture element. Of course, the signal output line has an electrostatic capacitance to ground of a certain magnitude and, in the state in which a switch between the picture element cell once read out and the signal output line is turned OFF to electrically isolate them, the image signal read out previously is attenuated with a time constant dependent on the product of the abovesaid capacitance value and the resistance value of the signal output line, so that the abovesaid problem is not so serious in an experimental device on a small scale in which the number of picture elements is small and the readout rate is low. For example, in the case of obtaining an image of picture quality equal to that of a still picture by silver salt photography (picture quality equal to an image enlarged six times using, for instance, a 110-size film) through utilization of this solid-state image sensor element, $512 \times 767$ picture elements, for instance, are needed. With such a large number of picture elements, the electrostatic capacitance to ground and the resistance value of the signal output line both increase to cause an increase in the discharge time and, on the other hand, the picture element readout intervals are reduced, resulting in the interference by the previous picture element rapidly increasing.

SUMMARY OF THE INVENTION

It is therefore an object of the present invention to provide an economical image signal readout method with which it is possible to accurately read out an image signal while preventing interference between a plurality of picture elements having the non-destructive readout characteristic and connected to the same signal output line.

The abovesaid object is achieved by providing an image signal readout method for a solid-state image sensor which is provided with a plurality of solid-state picture element cells having a non-destructive readout characteristic and arranged two-dimensionally, a plurality of vertical scanning signal lines having connected thereto the picture element cells in a horizontal direction, and a plurality of picture element signal output lines having connected thereto the picture element cells in a vertical direction, and in which picture element signals in the solid-state picture element cells connected to that one of the vertical scanning signal lines that is selected by sequential scanning are sequentially provided to the corresponding one of the picture element signal output lines and, in the selection period of the vertical scanning signal line thus selected, image signals of the solid-state picture element cell group are read out from the picture element signal output line, characterized in that a blanking period is provided between the selection period of the selected vertical scanning signal line and the selection period of the vertical scanning signal line selected next and, in this blanking period, the picture element signal output lines are held at a reference potential.

DESCRIPTION OF THE PREFERRED EMBODIMENTS

Figure 1:
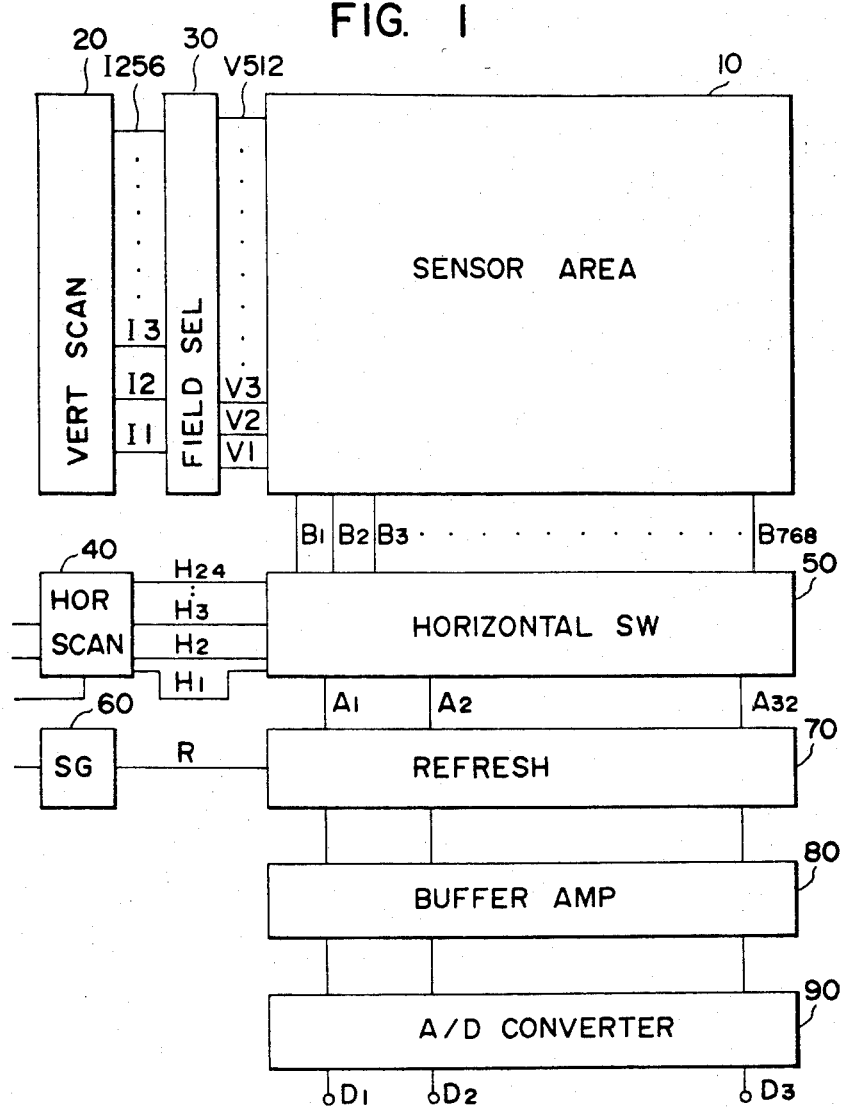
FIG. 1 is a block diagram illustrating the arrangement of a solid-state image sensor for use in an embodiment of the present invention.

A solid-state image sensor for use in an embodiment of the present invention comprises, as shown in FIG. 1, a sensor area 10 equipped with, for instance, $512 \times 768$ picture element cells arranged in a matrix form, a vertical scanning circuit 20, a field select switch 30, a horizontal scanning circuit 40, a horizontal switching circuit 50, a refresh signal generator 60, a refresh circuit 70, a buffer amplifier 80 and an A/D conveter circuit 90. The words "vertical" and "horizontal" mentioned herein are intended to indicate a first direction in the picture element array and a second direction perpendicular thereto, and they do not indicate absolute positions.

Figure 2:
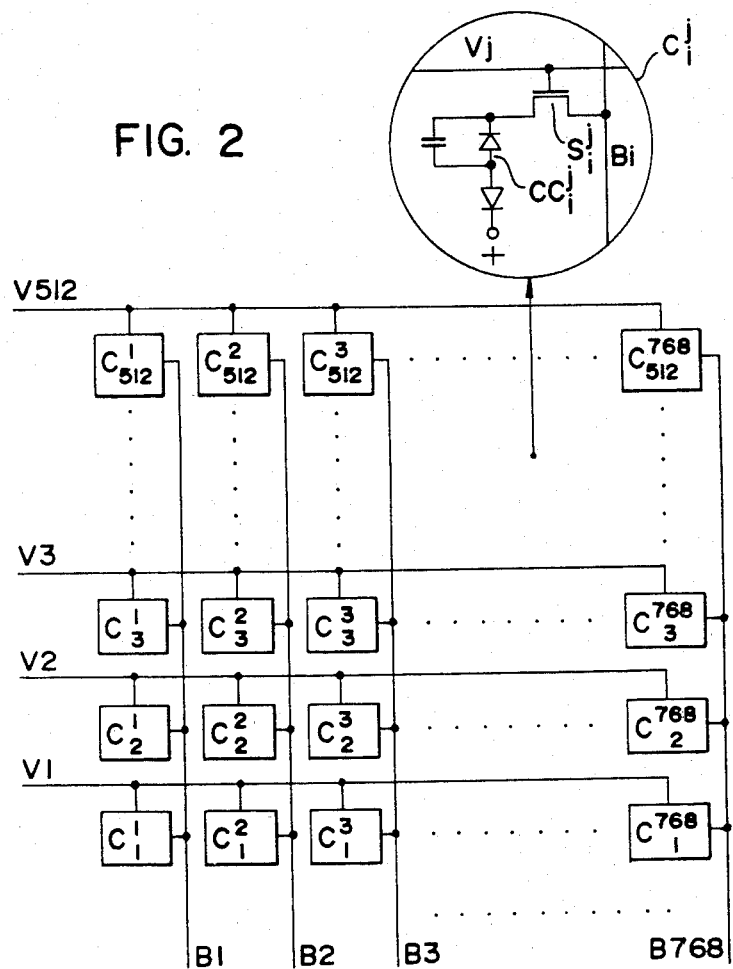
FIG. 2 is a connection diagram showing an example of the arrangement of a sensor area 10 used in FIG. 1.

The sensor area 10 comprises, as shown in FIG. 2, picture element cells $C_i^j$ (hereinafter referred to simply as "cells") of the same construction arranged in a matrix form of 512 ($2^9$) rows and 768 ($3 \times 2^8$) columns, the cells being respectively connected to 512 vertical scanning signal lines V1 to V512 and 768 signal output lines B1 to B768. As shown on an enlarged scale in the illustrated circle about the photodetector $C_i^j$, the cells are each provided with a photodetector $CC_i^j$ of a hook structure and a MOS switch $S_i^j$, which has its main electrode connected to the photodetector $CC_i^j$ and the signal output line $B_i$ and has its gate electrode connected to the vertical scanning signal line $V_j$. With such an arrangement, when a signal on the vertical signal line $V_j$ becomes high-level, a picture element signal of positive voltage stored by light irradiation in the photo detector $CC_i^j$ is read out on the signal output line $B_i$. It must be noted here that since the abovesaid reading is nondestructive, the picture element signal of the photodetector $CC_i^j$ remains present on the signal output line $B_i$ over the entire signal readout period, even after being read out on the signal output line $B_i$.

Figure 3:
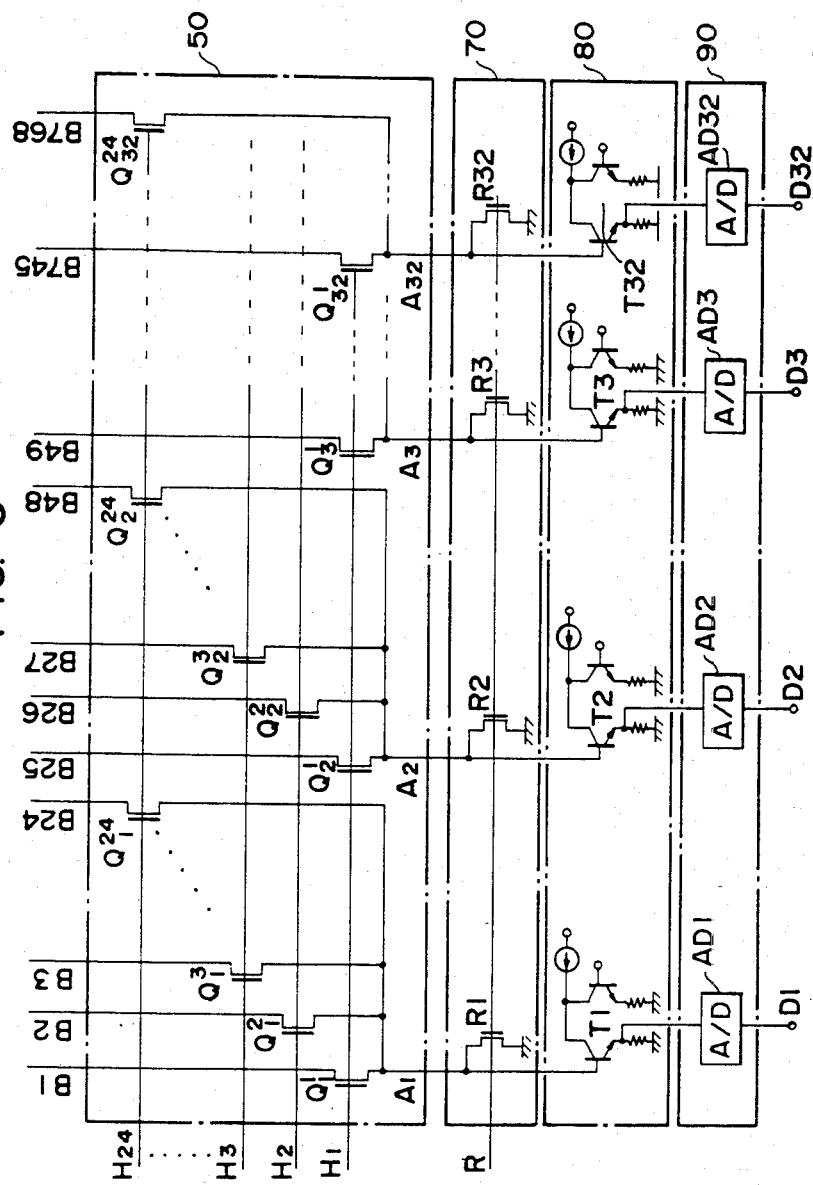
FIG. 3 is a connection diagram showing in detail the arrangement of a horizontal switching circuit 50, a refresh circuit 70, a buffer amplifier circuit 80 and an A/D converter 90 utilized in FIG. 1.

FIG. 3 is a detailed connection diagram illustrating the arrangements of the horizontal switch 50, the refresh circuit 70, the buffer amplifier 80 and the A/D converter circuit 90 used in FIG. 1. The 768 signal output lines B1 to B768 are interconnected by steps of 24 to form 32 sub-groups and 32 multiplex signal output lines A1 to A32 of the sub-groups are connected to the refresh circuit 70. The leftmost signal output lines B1, B25, B49, . . . B745 of the respective sub-groups are connected to MOS switches $Q_1^1$, $Q_2^1$, $Q_3^1$, . . . $Q_{32}^1$, respectively, the gate electrodes of which are all connected to a common horizontal scanning signal line H1. The signal output lines B2, B26, B50, . . . B746 second from the left in the respective sub-groups are connected to MOS switches $Q_1^2$, $Q_2^2$, $Q_3^2$, . . . $Q_{32}^2$, the gate electrodes of which are all connected to a common horizontal scanning signal line H2. In a similar manner, corresponding ones of the other remaining signal output lines of the sub-groups are connected to MOS switches which have their gate electrodes connected to common horizontal scanning signal lines. With such an arrangement, when a signal on the horizontal scanning signal line H1 becomes high-level, the 32 leftmost signal output lines of the sub-groups are connected to the multiplex signal output lines A1 to A32 respectively correspondingly thereto. In a likewise manner, corresponding ones of the other remaining signal output lines of the sub-groups are connected to the multiplex signal lines A1 to A32 respectively corresponding thereto when signals on corresponding horizontal scanning signal lines become high-level.

The multiplex signal output lines A1 to A32 are respectively connected via MOS switches R1 to R32 to a reference potential exemplified by the ground potential in the refresh circuit 70. The gate electrodes of the MOS switches R1 to R32 are connected to a common refresh signal line R. When a signal on the refresh signal line R becomes high-level, all the multiplex signal output lines are held at the reference potential.

The multiplex signal output lines A1 to A32 are respectively connected via amplifiers T1 to T32 of the buffer amplifier 30 to A/D converters AD1 to AD32 of the A/D converter circuit 90. The A/D converters AD1 to AD32 respectively convert analog picture element signals on the multiplex signal output lines to digital form, providing the digital picture element signals to digital output terminals D1 to D32. The amplifiers T1 to T32 of the buffer amplifier circuit 80 are each composed of a pair of transistors connected in parallel between a common constant-current source and the ground. The base of one of the transistors is supplied with the analog picture element signal and the base of the other transistor is supplied with a dark voltage from a masked picture element cell (not shown) provided separately of the picture element cells for forming an image on an element and, as a result of this, an analog image signal having subtracted therefrom is applied to the A/D converter circuit 90.

Figure 4:
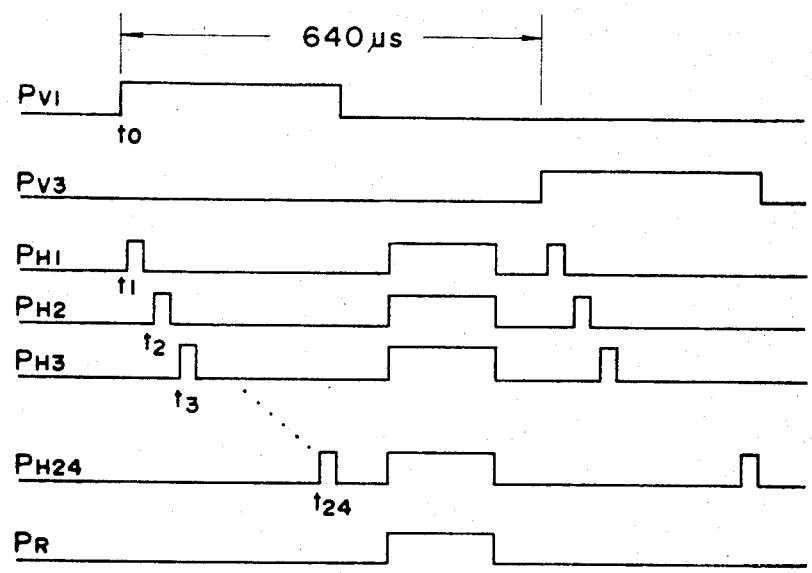
FIG. 4 is a waveform diagram explanatory of the operation of the solid-state image sensor having the arrangement shown in FIGS. 1 to 3.

Next, a description will be given, with reference to FIG. 4, of an example of the operation of an embodiment of the present invention, i.e. the solid-state image sensor having the arrangements shown in FIGS. 1 to 3. At a time $t_0$ a signal provided on a vertical scanning signal line I1 from the vertical scanning circuit 20 shown in FIG. 1 becomes high-level. The field select switch 30 connects the vertical scanning signal line V1 in an odd number field scanning period, by which a signal level $P_{V1}$ on the vertical scanning signal line V1 is high for about 320 $\mu$s (FIG. 4). As a result of this, the MOS switches $S_1^1$ to $S_1^{768}$ in the 768 cells $C_1^1$ to $C_1^{768}$ in the sensor array 10 connected to the vertical scanning signal line V1 conduct, by which picture element signals in the cells $C_1^1$ to $C_1^{768}$ are provided on the signal output lines B1 to B768, respectively.

At a time $t_1$ a little after the time $t_0$, a signal $P_{H1}$ provided on the horizontal scanning signal line H1 from the horizontal scanning circuit 40 becomes high, by which the MOS switches $Q_1^1$ to $Q_{32}^1$ in the horizontal switching circuit 50 are turned ON. In consequence, picture element signals on the leftmost signal lines B1 to B745 of the 32 sub-groups of the signal output lines B1 to B768 are delivered on the multiplex signal output lines A1 to A32, respectively. The picture element signals on these multiplex signal lines are provided to the digital picture element signal output terminals D1 to D32 via the refresh circuit 70 in which all the MOS switches R1 to R32 are all held in the OFF state, the buffer amplifier circuit 80 and the A/D converter circuit 90, respectively. Thereafter, when the signal $P_{H1}$ on the horizontal scanning signal line H1 is returned to its low-level state, the MOS switches $Q_1^1$ to $Q_{32}^1$ of the horizontal switching circuit 50 become nonconductive and the voltages on the multiplex signal lines A1 to A32 return to the state before the readout.

At a time $t_2$ after several $\mu$s, a signal $P_{H2}$ on the horizontal scanning signal line H2 becomes high-level. As a result, the MOS switches $Q_1^2$ to $Q_{32}^2$ of the horizontal switching circuit 50 conduct, by which voltages on the signal output lines B2 to B746 second from the left in the sub-groups of the signal output lines B1 to B768 are provided on the multiplex signal output lines A1 to A32, respectively. The voltages on the multiplex signal output lines are respectively provided to the digital picture element signal output terminals D1 to D32 via the refresh circuit 70 in which all the MOS switches R1 to R32 are held in the OFF state, the buffer amplifier circuit 80 and the A/D converter circuit 90. Thereafter, when the signal $P_{H2}$ on the horizontal scanning signal line H2 returns to its low-level state, the MOS switches $Q_1^2$ to $Q_{32}^2$ become nonconductive, returning the voltage on the multiplex signal output lines to their initial state. Similarly, signals on the horizontal scanning signal lines H3 to H24 become high-level one after another, by which analog picture element signals on the signal output lines of the respective sub-groups are sequentially provided on the digital picture signal output terminals D1 to D32.

After return of a signal $P_{H24}$ on the last horizontal scanning signal line H24 to the low-level state, the signal $P_{V1}$ on the vertical scanning signal line V1 returns to the low-level state, completing the horizontal scanning of all the cells connected to the signal line V1. That is, the MOS switch $S_i{}^j$ in the cell $C_i{}^j$ (j=1, 2, ... 768) is turned OFF. Since the photodetector $CC_i{}^j$ has the non-destructive readout characteristic, however, picture element signals are output on the signal output lines B1 to B768 until immediately before the MOS switch $S_i{}^j$ (j=1, 2, ... 768) driven by the vertical scanning circuit provided in each cell becomes nonconductive, and thereafter these picture element signals are each attenuated while being discharged with a time constant dependent on the ground capacity of the signal output line. If the discharge time constant is large, then the preceding picture element signal remains unremoved on each signal output line in the next subsequent horizontal scanning of the cells connected to the vertical scanning signal line V3, resulting in interference with the picture element signal to be read out subsequently. In other words, in the case where the discharge time constant is large, even if the horizontal scanning signal line $V_{j+2}$ ($V_{j+1}$ in the case where the interlaced scanning is not used) is selected after the horizontal signal line $V_j$ to read out the picture element signal from the photodetector $CC_i{}^{j+2}$ ($CC_i{}^{j+1}$ in the case where the interlaced scanning is not used) on to the signal output line $B_i$, accurate readout cannot be achieved because the signal read out previously from the photodetector $CC_i{}^j$ is still held on the signal output line $B_i$.

In order to prevent such interference, a blanking period is provided in the time interval between the completion of the readout of the cells connected to the signal line V1 and the start of the readout of the cells connected to the signal line V3 as shown in FIG. 4. In the blanking period the signals $P_{H1}$ to $P_{H24}$ on all the horizontal scanning signal lines H1 to H24 are made high-level to conduct the MOS switches $Q_1{}^1$ to $Q_{32}{}^{24}$, by which all the signal output lines B1 to B768 are connected to the common signal output lines A1 to A32 corresponding thereto. At the same time, the signal $P_R$ on the refresh line R is made high-level to conduct the MOS switches R1 to R32, by which the multiplex signal output lines A1 to A32 are grounded. As a result of this, all the signal output lines B1 to B768 are grounded to thereby refresh (clear) the remaining picture element signal of the previous scanning.

In the present invention, since the cells have the non-destructive readout characteristic, it is important to provide in the time interval between switching of one signal line $V_j$ and switching of the next signal line (for example, $V_{j+2}$ in the case of the interlaced scanning), that is, to refresh (clear) the signal output lines B1 to B768 in such a state in which the cells are not electrically connected to any of the signal output lines B1 to B768.

While the foregoing description has been given of the case where the sum of the selecting period of one vertical scanning signal line and the blanking period (the period from the selection of one vertical scanning signal line and the selection of the next vertical scanning signal line) is 640 μs, the present invention is not limited specifically thereto. For instance, this period can also be reduced by half and, in such a case, multi-exposure photography of about 10 frames per second can be achieved.

Following completion of such a refresh operation, a signal $P_{V3}$ on the vertical scanning signal line V3 becomes high-level, performing horizontal scanning of the cells connected to the signal line V3 in exactly the same manner as described above in respect of the vertical scanning signal line V1. Thereafter, picture element signals are similarly read out from the cells connected to odd number vertical scanning signal lines V3, V5, V7, V9, ... V511 while refreshing the signal output line in each blanking period, which is followed by readout of picture element signals from even number vertical scanning signal lines V2, V4, V6, ... V512, thereby completing scanning of one frame consisting of odd number fields and even number fields.

After all the picture element signals of all the picture element cells $CC_1{}^1$ to $CC_{512}{}^{768}$ are read out therefrom, picture signals stored in the sensor (for instance, in the sensor having the hook structure mentioned at the beginning of this specification, photo carriers stored in a potential well of the hook structure) are refreshed (cleared) in preparation for the next image formation, thus completing one process. This method of refreshing the sensor can be achieved by the operation of refresh cells provided corresponding to the picture element cells disclosed in the aforementioned Japanese Patent Application Nos. 54001/80 and 60316/80.

According to the foregoing embodiment, the blanking period is provided between the vertical scanning periods and, in this blanking period, the signal output lines are refreshed (cleared), so that it is possible to effectively prevent interference between the cells having the non-destructive readout characteristic.

Furthermore, by the employment of a multiplex arrangement in which the signal output lines are divided into sub-groups and corresponding cells connected to the corresponding signal output lines of the sub-groups are simultaneously read out, the signal readout rate can be reduced by a reciprocal multiple of the number of the sub-groups, even in the case of readout of a solid-state image sensor which is required to provide picture quality equal to that of a still picture as by silver salt photography and has a large number of picture elements, and spike noises resulting from opening and closing the MOS switches can be substantially decreased. Moreover, if simultaneous multitrack recording is carried out through the use of a multitrack head corresponding to the number of the sub-groups as magnetic recording means for recording signals at the digital video output terminal, a low-speed recording device of studio grade can be employed. Besides, the division of the signal output lines into the sub-groups also permits the reduction of the number of the MOS switches for refreshing the signal output lines.

Further, in order to reduce the signal readout rate from the solid-state image sensor as described above, it is necessary to use an element having the non-destructive readout characteristic and a large signal retaining time as in the present invention; therefore, it is very effective to devise the refreshing of the signal output lines and to perform low-speed signal readout by splitting the signal output line into sub-groups.

In the foregoing embodiment, the signal output lines split into the sub-groups are sequentially horizontal-scanned in each sub-group to read out the signal of each picture element. With this method, signals can be read out from a solid-state image sensor which is required to provide high picture quality and has a large number of picture elements, with the spike noise sufficiently reduced, as described above. In addition, since the number of output terminals can be made smaller than that of the signal output lines, the signals obtained can simultaneously be recorded by a small number of magnetic heads on many tracks. However, the signal readout method of the present invention is not limited specifically thereto; for instance, all the signal output lines can also be selected one after another by a horizontal scanning circuit. Also it is possible to provide output terminals of the same number as the signal output lines corresponding thereto, so that picture elements of one horizontal line may be read out simultaneously. In this case, the horizontal scanning circuit is not needed.

Figure 5A:
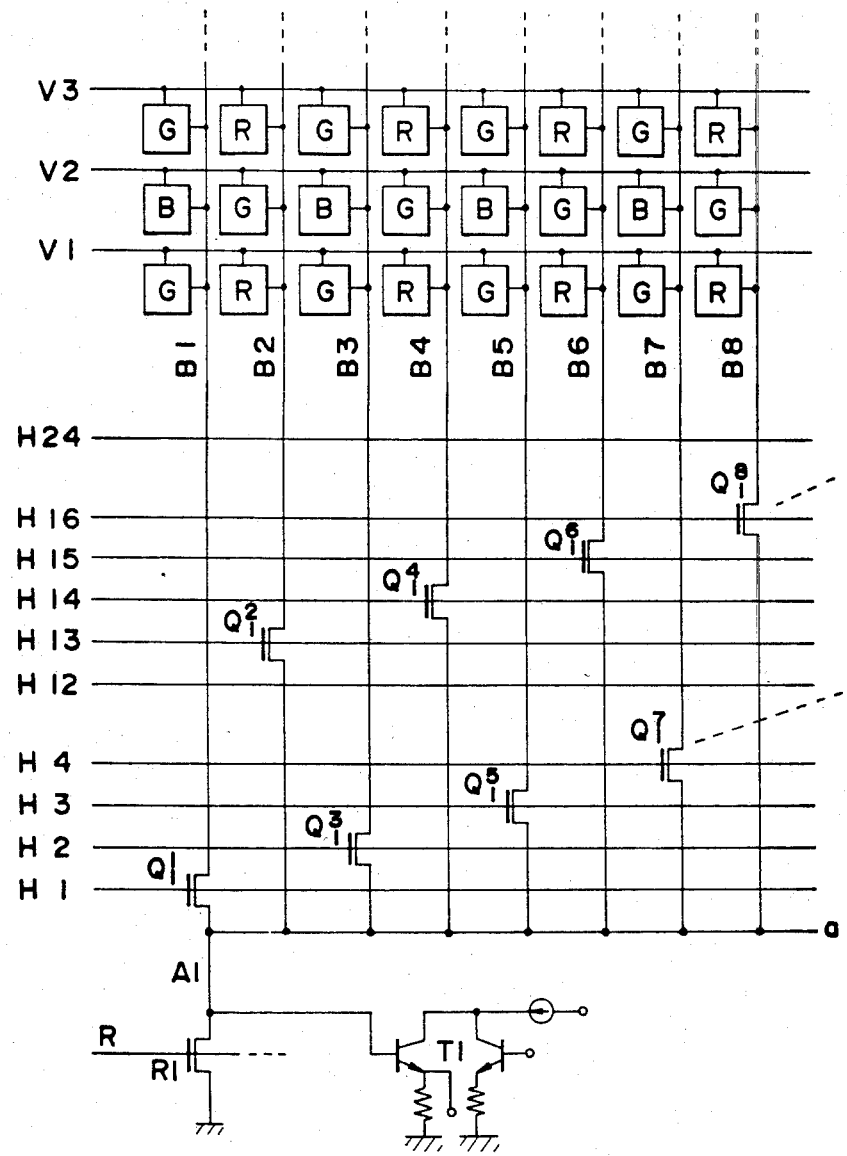
FIGS. 5A, 5B, 6A, 6B and 7A to 7C are block diagrams illustrating the principal parts of examples of arrangements for the application of the present invention to color television.
Figure 5B:
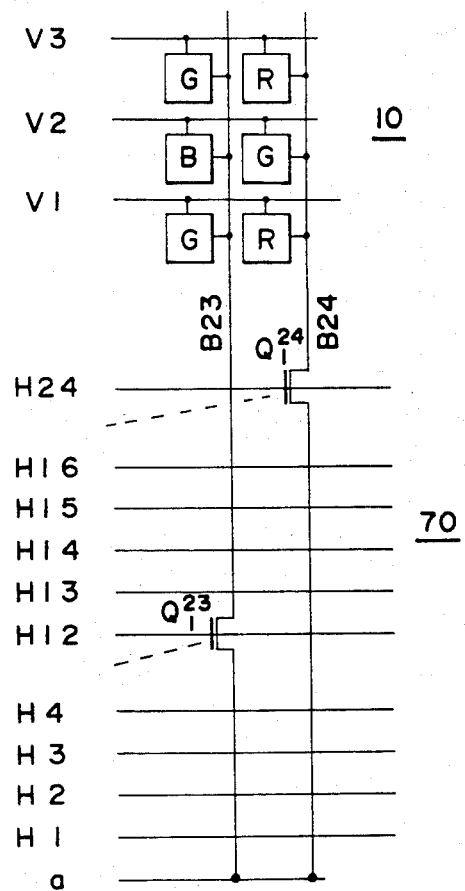

FIGS. 5A and 5B illustrate the principal part of an example of the arrangement for the application of the present invention to color television. The cells are respectively covered with color filters of three primary colors of green (G), blue (B) and red (R) following the Baiyer arrangement. The MOS switches $Q_1^1$ to $Q_1^{24}$ of a sub-group 1 in the horizontal switching circuit 70 are divided into a group of MOS switches $Q_1^1$, $Q_1^3$, $Q_1^5$, ... $Q_1^{23}$ whose numbers of arrangement from the left-hand side are odd and a group of MOS switches $Q_1^2$, $Q_1^4$, $Q_1^6$, ... $Q_1^{24}$ whose numbers of arrangement are even. The MOS switches belonging to the odd-number group are sequentially connected to the horizontal scanning signal lines H1 to H12 in the order of the arrangement from the left-hand side, and the MOS switches belonging to the even-number group are similarly connected to the horizontal scanning signal lines H13 to H24 in the sequential order of the arrangement from the left-hand side.

With such an arrangement, when making high-level the signals $P_{H1}$ to $P_{H24}$ on the horizontal scanning signal lines H1 to H12 in succession while holding the signal $P_{V1}$ on the vertical scanning signal line V1 high-level, 12 green (G) signals are provided in succession on the multiplex signal output line A1 and, thereafter, when making the signals on the horizontal scanning signal lines H13 to H24 high-level in a sequential order, 12 red (R) signals are provided in succession on the multiplex signal output line A1. Next, when making the signals on the horizontal scanning signal lines H1 to H24 high-level one after another while holding the signal on the vertical scanning signal line V3 high-level, a series of 12 green (G) signals are provided on the multiplex signal output line A1 first and then a series of 12 red (R) signals are provided. In the subsequent scanning of the odd number fields, a series of 12 green (G) signals and a series of 12 red (R) signals are alternately yielded on the multiplex signal output lines A1 by the same operation as described above. In the scanning of the even number fields, a series of 12 blue (B) signals and a series of 12 green (G) signals are produced. Since the respective color signals are always yielded by steps of 12 as described above, they can easily be separated by using a clock obtained by frequency dividing a clock for horizontal scanning down to 1/12.

Figure 6A:
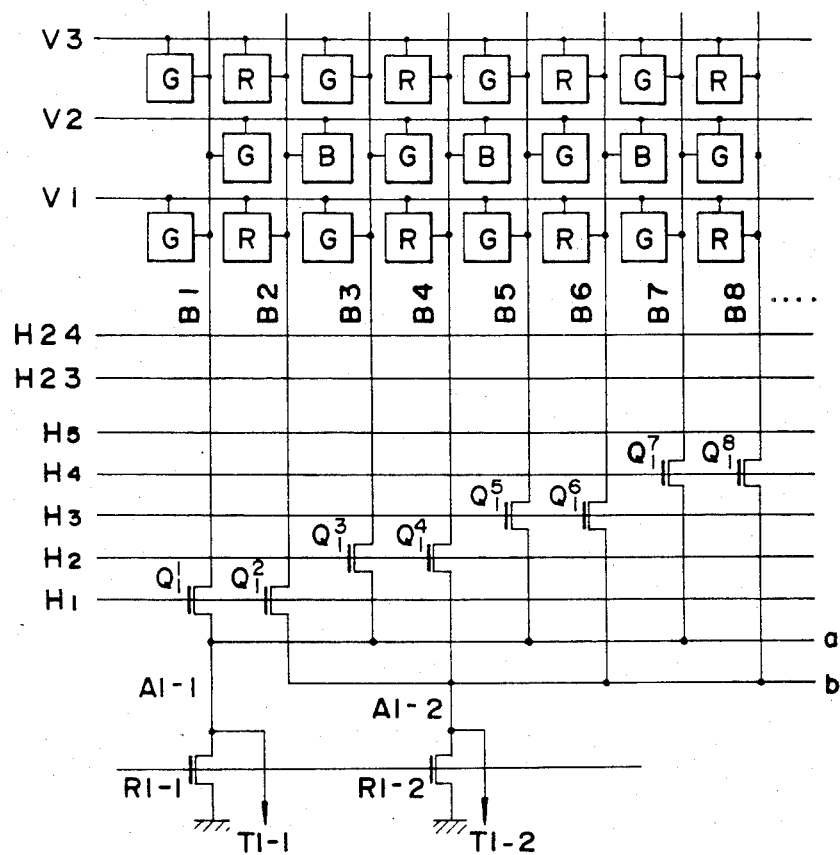
Figure 6B:
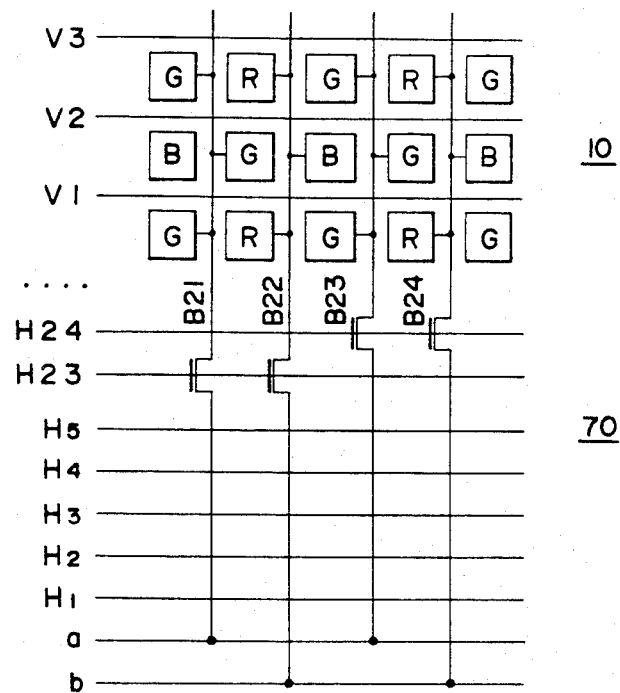

FIGS. 6A and 6B illustrate the principal part of another example of the arrangement for the application of the present invention to the color television. The respective cells are covered with color filters of the three primary colors R, B and R following the Baiyer arrangement. The signal output lines B1 to B24 are divided into a group of odd-numbered signal output lines B1, B3, B5, ... B23 and a group of even-numbered signal output lines B2, B4, B6, ... B24. The signal output lines belonging to the respective groups are connected to multiplex signal output lines A1-1 and A1-2, respectively. Each pair of signal output lines of the same arrangement number from the left-hand side in both the odd and even number groups are connected to an MOS switch which has its gate connected to one of the common horizontal scanning signal output lines H1 to H24. Further, the cells belonging to the even number field are connected so that their picture element signals may be provided on the signal output lines arranged on the left thereof.

With such an arrangement, only the green signal is provided on the one multiplex signal line A1-1 during the scanning periods of both the even and odd number fields and, while on the other multiplex signal line A1-2, only the red signal is provided during the scanning of the odd number field and, during scanning of the even number field, only the blue signal is provided. This allows more ease in the separation of color signals than in the case of FIG. 5.

Figure 7A:
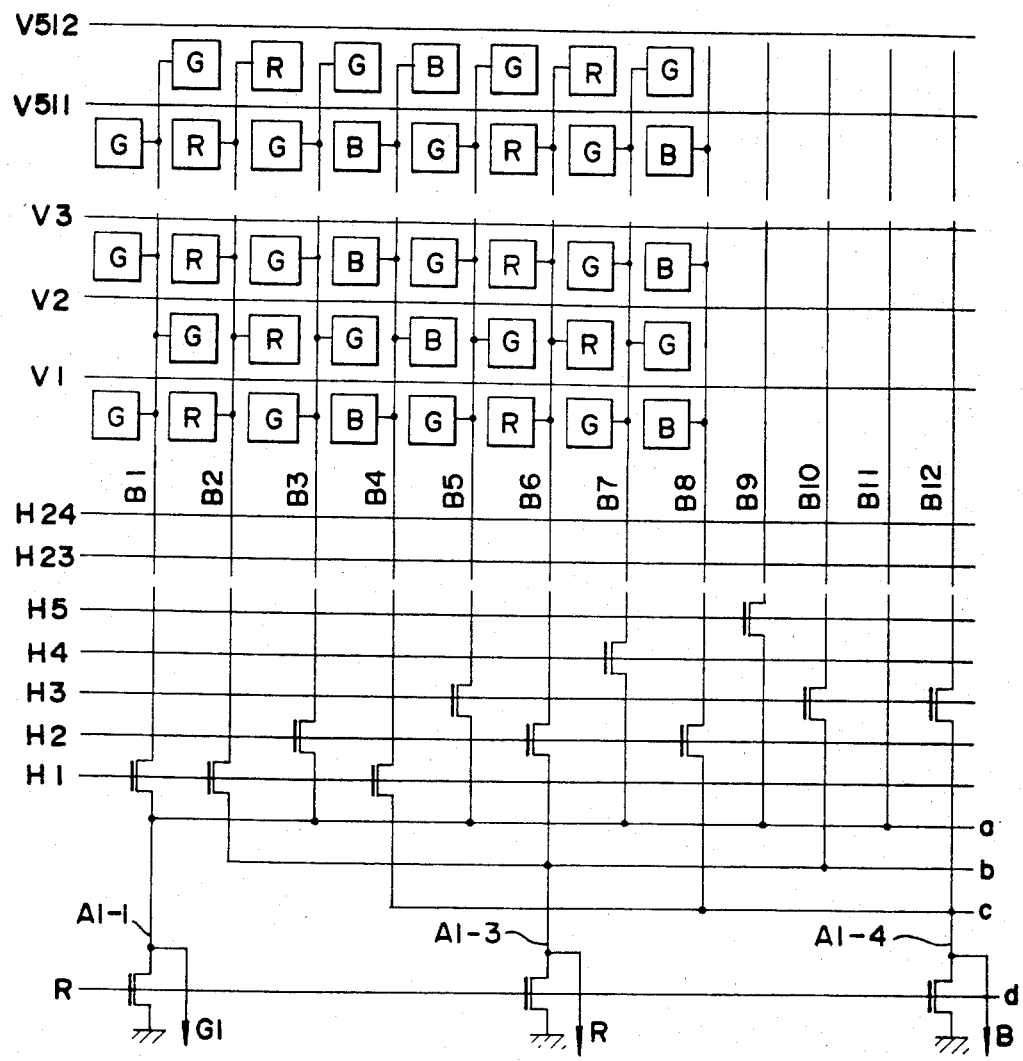
Figure 7B:
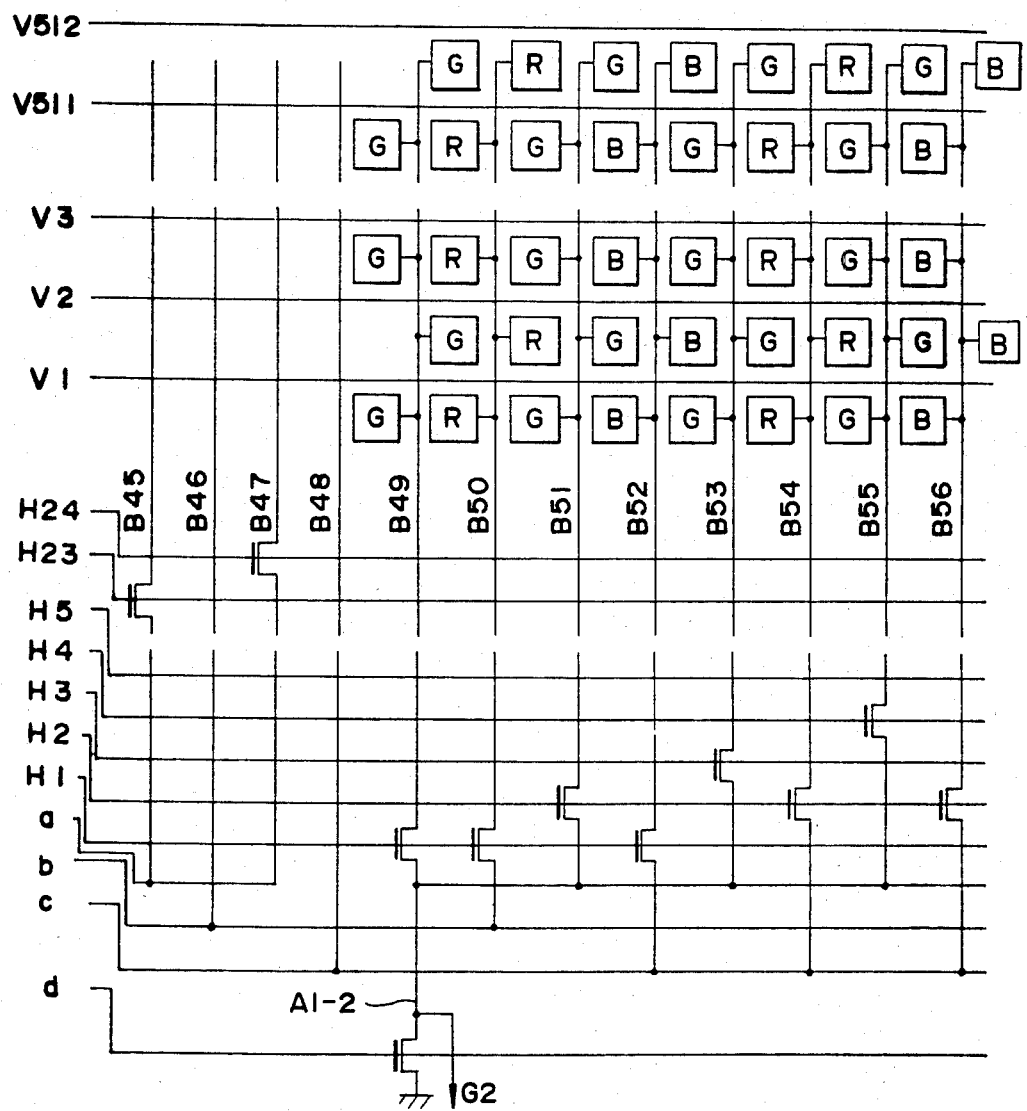
Figure 7C:
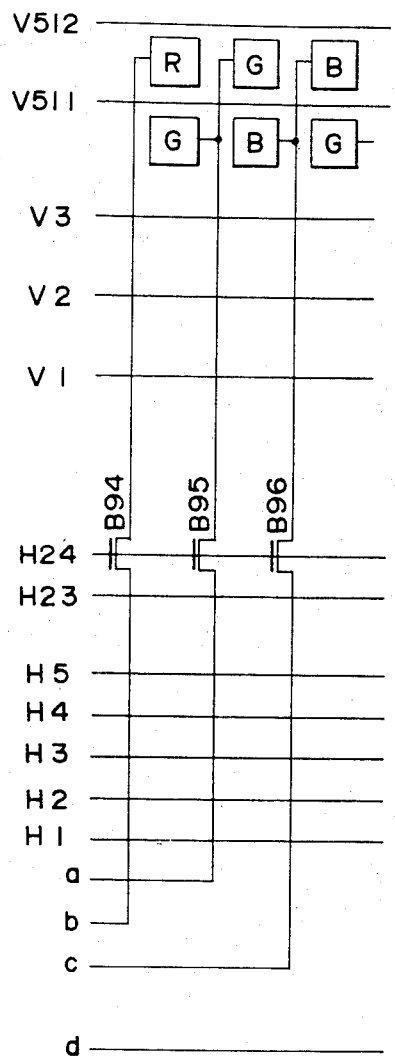

FIGS. 7A, 7B and 7C illustrate the principal part of another example of the arrangement for application of the present invention to color television. The cells are respectively covered with color filters of the three primary colors of green, blue and red following the interleave arrangement, and the signal output lines form a sub-group by steps of 96. The sub-groups are each subdivided into first, second, third and fourth groups, and the signal output lines of each group are connected to multiplex signal output lines A1-1, A1-2, A1-3 and A1-4 respectively corresponding thereto. The first group consists of lines B1, B3, B5, ... B47 of 1st to 47th odd arrangement numbers; the second group consists of lines B49, B51, B53, ... B95 of 49th to 95th odd arrangement numbers; the third group consists of lines B2, B6, B10, ... B94 of every fourth even arrangement numbers from 2nd to 94th; and the fourth group consists of lines B4, B8, B12, ... B96 of every fourth even arrangement numbers from 4th to 96th. MOS switches for connecting the signal output lines of each line group to the corresponding multiplex signal output lines have gate electrodes connected to the horizontal scanning signal lines H1 to H24 in the order of the arrangement numbers in the respective group.

With such an arrangement, a first green signal G1, a second green signal G2, a red signal R and a blue signal B are respectively provided on the multiplex signal output lines A1-1, A1-2, A1-3 and A1-4 over the entire scanning period in the frame regardless of whether the field being scanned is an odd or even field, and this permits very easy separation of color signals.

As has been described in the foregoing, according to the image signal readout method of the present invention, a blanking period is provided between adjacent periods of selecting different vertical scanning signal lines and, in this blanking period, the signal output lines are held at a reference potential, so that it is possible to read out image signal from picture element cells having the non-destructive readout characteristic while effectively preventing mutual interference between the image signals.

Furthermore, according to an embodiment of the present invention, since use is made of an arrangement in which signal output lines are multiplexed in accordance with the arrangement of color filters, the construction of a refresh circuit can be simplified and color separation can be effected with much ease.

It will be apparent that many modifications and variations may be effected without departing from the scope of the novel concepts of the present invention.

What is claimed is:

1. An image signal readout method for a solid-state image sensor which is provided with a plurality of solid-state picture element cells having a non-destructive readout characteristic and arranged two-dimensionally, a plurality of vertical scanning signal lines each having connected thereto a respective horizontal group of the picture elements cells aligned in a horizontal direction, and a plurality of a picture element signal output lines each having connected in common thereto a respective vertical group of the picture elements cells aligned in a vertical direction, comprising providing picture element signals from the respective solid-state picture elements cells of a selected one of said horizontal groups to the respective vertical scanning signal line, for all of said horizontal groups during respective selection periods by applying vertical scanning signals to the vertical scanning signal lines, to the corresponding picture element signal output lines during each respective selection period, reading out in each said respective selection period said picture element signals of the respective horizontal group of solid-state picture elements cells from the picture element signal output lines, and providing a blanking period between successive ones of said selection periods, wherein, in each said blanking period, all of said picture element signal output lines are cleared by providing them with a reference potential.

2. The method of claim 1 wherein groups of said picture element signal output lines are connected in common to respective multiplex signal output lines and, in the blanking period, said clearing of said picture element signal output lines occurs by providing said reference potential to said multiplex output signal lines.

3. The method of claim 2, wherein a plurality of horizontal scanning signals corresponding to the number of said picture element signal output lines in each said group thereof are successively provided in common to each said multiplex output signal line for successively reading out the predetermined signals on respective ones of said picture element signal output lines from each said multiplex output signal line.

4. The method of claim 3, wherein said solid-state picture element cells are divided into three groups sensitive to respective colors and ordered in said horizontal and vertical groups, and said groups of picture element signal output lines, said vertical scanning signals, and said horizontal scanning signals are provided, in a manner so that said signals read out from all of said multiplex output signal lines have in common the feature that during a first and a third one of said selection periods said output signals alternately correspond to a first and a second of said colors and during the successive selection period said read out signals alternately correspond to the third color and to one of said first and second colors.

5. The method of claim 3, wherein said solid-state picture element cells are divided into three groups sensitive to respective colors and ordered in said horizontal and vertical groups, and said groups of picture element signal output lines, said vertical scanning signals, and said horizontal scanning signals are provided, and said multiplex output signal lines are arranged in pairs, in a manner so that said signals read out from a first one of said multiplex output signal lines of each said pair correspond to a first and a second of said colors, and the signals read out from the second of the pair correspond to the third of said colors and to one of the first and second of said colors.

6. The method of claim 3, comprising three of said multiplex output signal lines, wherein said solid-state picture element cells are divided into three groups sensitive to respective colors and ordered in said horizontal and vertical groups, and said groups of picture element signal output lines, said vertical scanning signals, and said horizontal scanning signals are provided, in a manner so that all of said signals read out from each said multiplex output signal line correspond to a respective one of said colors.

7. An image detecting device, comprising
a plurality of image sensors for non-destructive readout arranged in rows and columns in an array,
a plurality of vertical scanning signal lines, each connected to a respective group of said sensors arranged horizontally along a respective row of said array, wherein vertical scanning signals are successively applied to said vertical scanning lines to select the respective groups of said sensors,
a plurality of image output lines, each electrically connected directly to a respective group of said sensors for non-destructive readout arranged vertically along a respective column of said array, wherein image signals are output on said image output lines from said sensors selected by said vertical scanning lines, and
means for clearing said image output lines by setting the voltages thereon to a reference voltage in between the occurence of each successive pair of said vertical scanning signals.

8. The method of claim 1, comprising providing a direct electrical connection between each said selected picture element cell and said cleared picture element signal output line.

* * * * *

UNITED STATES PATENT AND TRADEMARK OFFICE
CERTIFICATE OF CORRECTION

PATENT NO. : 4,504,865
DATED : March 12, 1985
INVENTOR(S) : Jun-ichi Nishizawa et al.

It is certified that error appears in the above-identified patent and that said Letters Patent is hereby corrected as shown below:

On the title page, in Items /73/ and /75/, "Minami-ashigara", each occurrence, should read -- Minami-Ashigara --.

Column 2, line 66, "conveter" should read -- converter --.

Column 9, lines 13, 16, 19 and 29, "elements", each occurrence, should read -- element --.

Signed and Sealed this

Fifth Day of November 1985

[SEAL]

Attest:

Attesting Officer

DONALD J. QUIGG

Commissioner of Patents and Trademarks